US008240008B2

(12) United States Patent
Newman, Jr. et al.

(10) Patent No.: US 8,240,008 B2
(45) Date of Patent: *Aug. 14, 2012

(54) ON-THE-GO ADJUSTABLE EXTENSION POLE PROVIDING HANDS-FREE TOOL CONNECTION AND DISCONNECTION

(75) Inventors: Robert D. Newman, Jr., Kansas City, MO (US); Judson C. Cole, Overland Park, KS (US); Eldon Morain, Broken Arrow, OK (US)

(73) Assignee: Robert D. Newman, Jr., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/690,562

(22) Filed: Jan. 20, 2010

(65) Prior Publication Data

US 2010/0115731 A1 May 13, 2010

Related U.S. Application Data

(63) Continuation of application No. 11/306,325, filed on Dec. 22, 2005, now Pat. No. 7,716,790.

(51) Int. Cl.
*B25G 1/04* (2006.01)
(52) U.S. Cl. .................. 16/429; 16/422; 16/427; 16/436
(58) Field of Classification Search .................. 16/422, 16/427, 429, 436; 29/426.1; 15/144.1–144.4, 15/145, 172, 176.1, 176.6, 202; 81/177.2; 294/19.1; 403/109.1, 109.5, 109.7, 109.8
See application file for complete search history.

(56) References Cited

U.S. PATENT DOCUMENTS

| 3,981,043 | A | * | 9/1976 | Curry | 16/430 |
| 4,105,346 | A | * | 8/1978 | Gelinas | 403/104 |
| 4,457,038 | A | * | 7/1984 | Hammond | 15/145 |
| 4,466,152 | A | * | 8/1984 | Moss et al. | 15/229.2 |
| 4,793,646 | A | | 12/1988 | Michaud, Jr. | |
| 6,254,305 | B1 | | 7/2001 | Taylor | |
| 6,461,074 | B2 | * | 10/2002 | Taylor | 403/378 |
| 6,854,919 | B2 | | 2/2005 | Neumann et al. | |
| 7,716,790 | B2 | | 5/2010 | Newman, Jr. et al. | |
| 2005/0097691 | A1 | * | 5/2005 | Tsuchiya et al. | 15/144.4 |

FOREIGN PATENT DOCUMENTS

WO 2004014617 A1 2/2004

OTHER PUBLICATIONS

Supplementary European Search Report from European Application No. EP 06846757 (dated Apr. 23, 2010).

* cited by examiner

*Primary Examiner* — Victor Batson
*Assistant Examiner* — Roberta Delisle
(74) *Attorney, Agent, or Firm* — Hovey Williams LLP

(57) ABSTRACT

A hands-free system for connecting and disconnecting a tool from an adjustable length extension pole. The system includes first and second slidably interconnected elongated members, a tool-holding assembly releasably coupled to the second elongated member, and a locking assembly disposed between the first and second elongated members. The relative sliding of the first and second elongated members can be selectively restrained by rotating the first and second elongated members relative to one another. The tool-holding assembly can be disconnected from the second elongated member by sliding the first and second elongated members together.

13 Claims, 4 Drawing Sheets

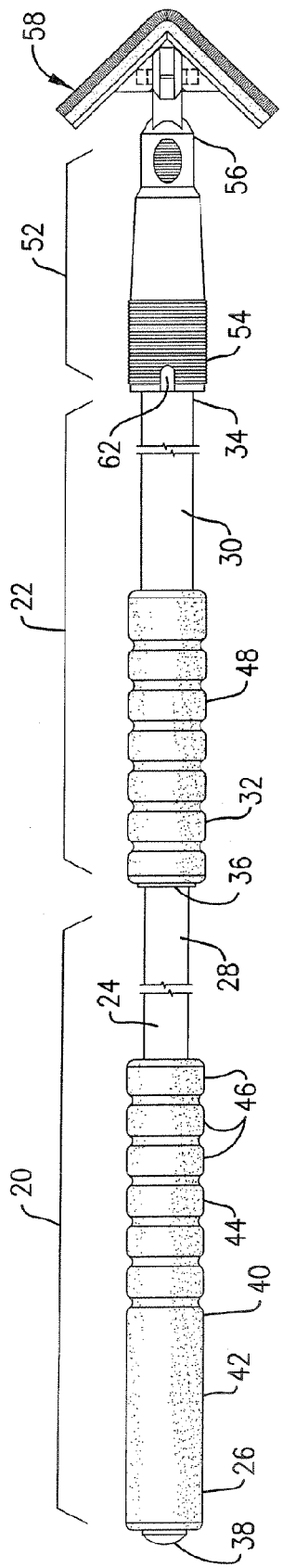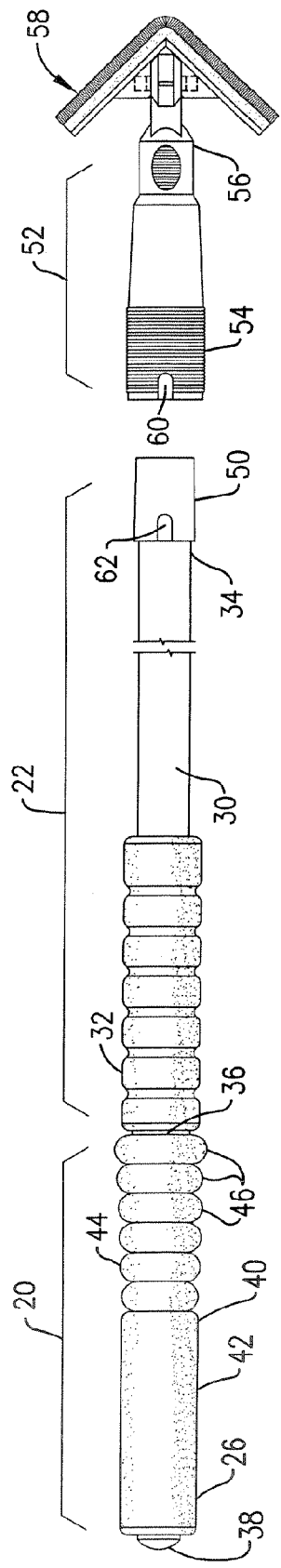

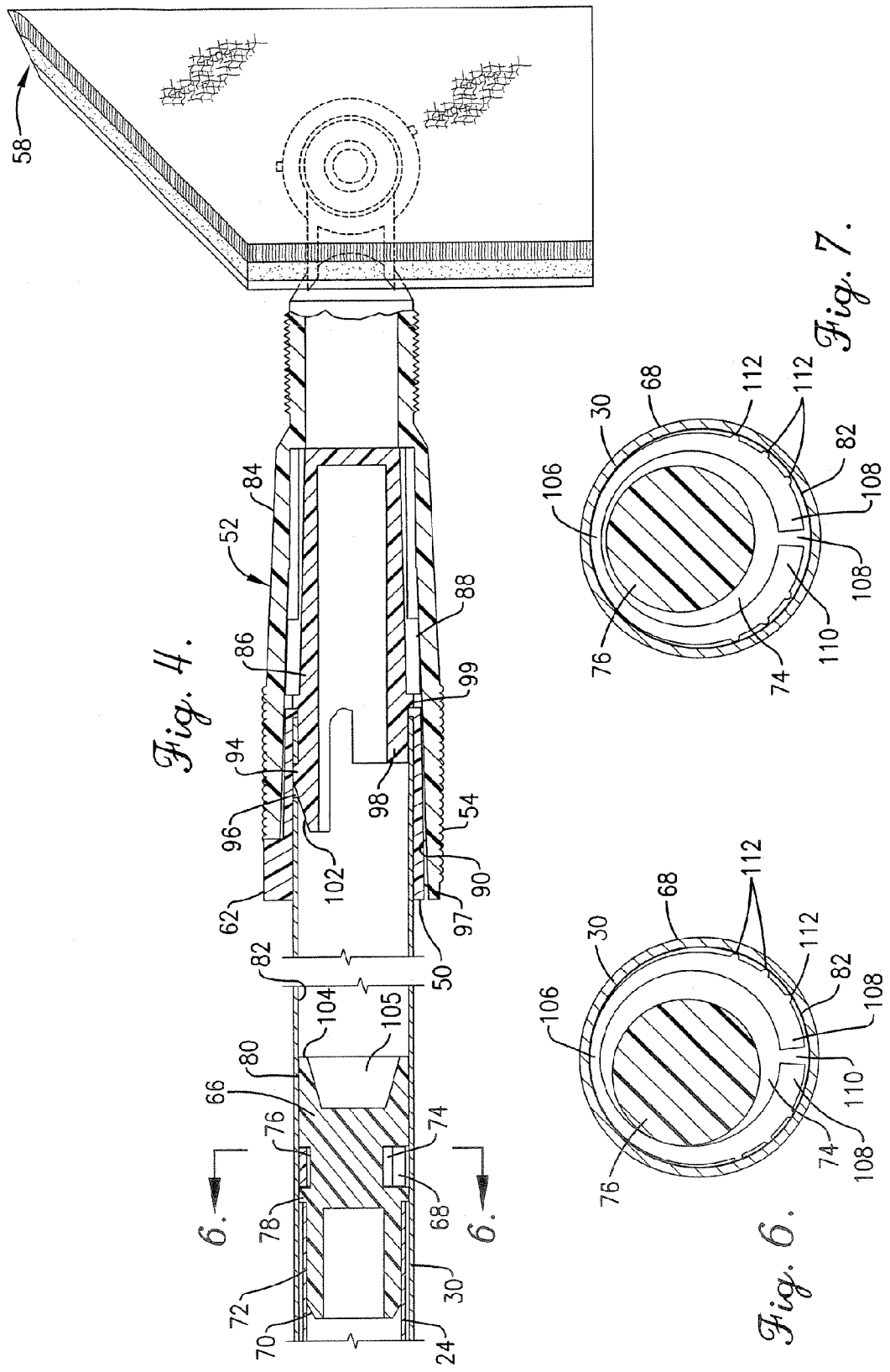

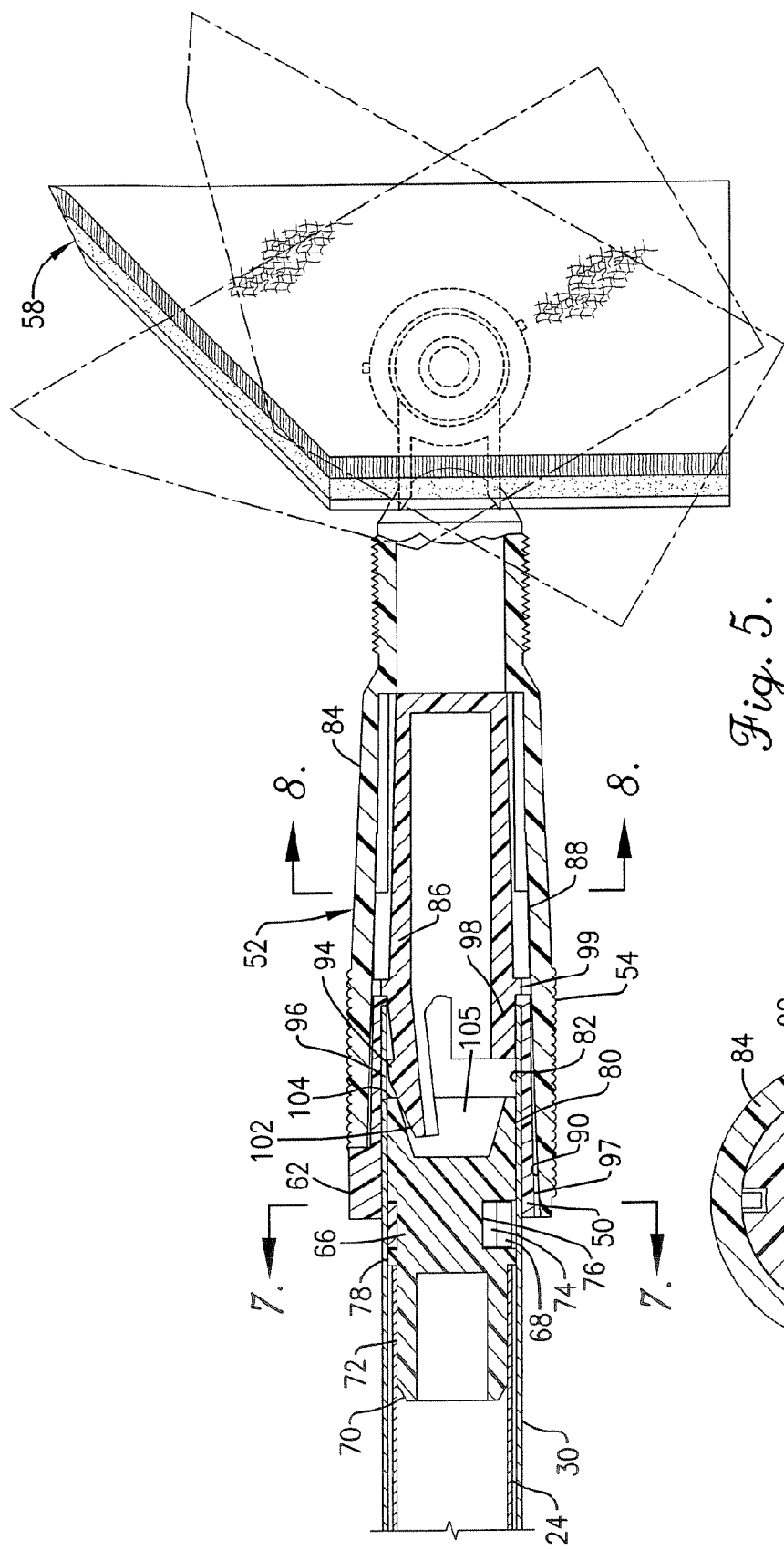

US 8,240,008 B2

ON-THE-GO ADJUSTABLE EXTENSION POLE PROVIDING HANDS-FREE TOOL CONNECTION AND DISCONNECTION

RELATED APPLICATION

The present application is a continuation application of identically titled U.S. patent application Ser. No. 11/306,325, filed Dec. 22, 2005, which is hereby incorporated by reference herein.

BACKGROUND OF THE INVENTION

1. Field of the Invention

This invention relates to adjustable extension poles. The invention further concerns adjustable extension poles which provide hands-free tool connection and disconnection.

2. Discussion of Prior Art

Extension poles are useful for a variety of purposes including, for example, painting, cleaning, and changing light bulbs. Typically a working tool is attached to the distal end of the pole and extended to a working location which is unreachable without extension. Because working locations may be of varying distances from the worker, it is typically necessary to either provide multiple extension poles of different lengths or a single extension pole of adjustable length. Further, it may be necessary to change from one type of working tool to another type of working tool while performing a single operation. For example, in painting applications it is often desirable to alternate working tools between a corner paint pad assembly and a wall roller.

Many conventional extension poles include a pair of telescoping tubes which can be selectively slid and locked relative to one another to provide length adjustability. However, these extension poles typically do not include a means for hands-free tool connection and disconnection. Further, one or more of the telescoping tubes of conventional extension poles generally includes openings to allow for proper functioning of the locking mechanism. Such openings in the telescoping tubes are disadvantageous because they allow debris to enter the tube where it may inhibit sliding and/or locking of the tubes.

SUMMARY OF THE INVENTION

A first aspect of the present invention concerns an apparatus comprising slidably intercoupled first and second elongated members and a working tool releasably connected to the second elongated member. The working tool is automatically disconnected from the second elongated member when the members are slid relative to one another into a tool disconnect position.

In a second aspect of the present invention, an apparatus is provided comprising a first elongated member, a second elongated member, and a tool-holding assembly. The first and second elongated members each have proximal and distal ends. The first and second elongated members are slidably interconnected. The tool-holding assembly includes a releasable catch which releasably couples the tool-holding assembly to the second elongated member. The distal end of the first elongated member and releasable catch are configured to decouple the tool-holding assembly from the second elongated member when the distal end of the first elongated member contacts the releasable catch as the members are slid relative to one another.

A third aspect of the present invention concerns an apparatus for extending the reach of a tool. The apparatus includes a first elongated member, a second tubular elongated member, a locking assembly, and a tool-holding assembly. The first and second elongated members each have proximal and distal ends. The first elongated member is slidably received within the second elongated member so that the distal end of the first elongated member is contained within the second elongated member. The locking assembly is configured to restrain relative sliding of the first and second elongated members when the first and second elongated members are rotated relative to one another to a locked position. The tool-holding assembly is releasably coupled to the distal end of the second elongated member.

In a fourth aspect of the present invention, a hands-free method for changing working tools on an extended reach device having a first elongated member telescopically received within a second elongated member is provided. The method comprises the step of sliding the first elongated member and the second elongated member together, thereby decoupling a first working tool from the second elongated member.

The present invention has the advantage of being easily extended, retracted, and locked. The present invention has the further advantage of allowing a worker to connect and disconnect a working tool from the extension pole without releasing a hand from the extension pole. A still further advantage of the present invention is that the pole is constructed to prevent debris from entering therein and inhibiting adjustability. Further advantages of the present invention will be apparent from the following detailed description of the preferred embodiment, claims, and drawing figures.

BRIEF DESCRIPTION OF THE DRAWING FIGURES

Preferred embodiments of the invention are described in detail below with reference to the attached drawing figures, wherein:

FIG. 1 is a top view of an adjustable extension pole coupled to a working tool;

FIG. 2 is a top view of an adjustable extension pole decoupled from a working tool;

FIG. 4 is a cross sectional view taken through the center of an adjustable extension pole and tool-holding assembly showing the tool-holding assembly secured to the extension pole;

FIG. 5 is a is a sectional view showing an adjustable extension pole and a tool-holding assembly where the tool-holding assembly is positioned for decoupling from the extension pole;

FIG. 6 is a cross sectional view taken along lines 6-6 in FIG. 4;

FIG. 7 is a cross sectional view taken along lines 7-7 in FIG. 5; and

FIG. 8 is a cross sectional view taken along lines 8-8 in FIG. 5.

DETAILED DESCRIPTION OF THE PREFERRED EMBODIMENTS

Figure 3:
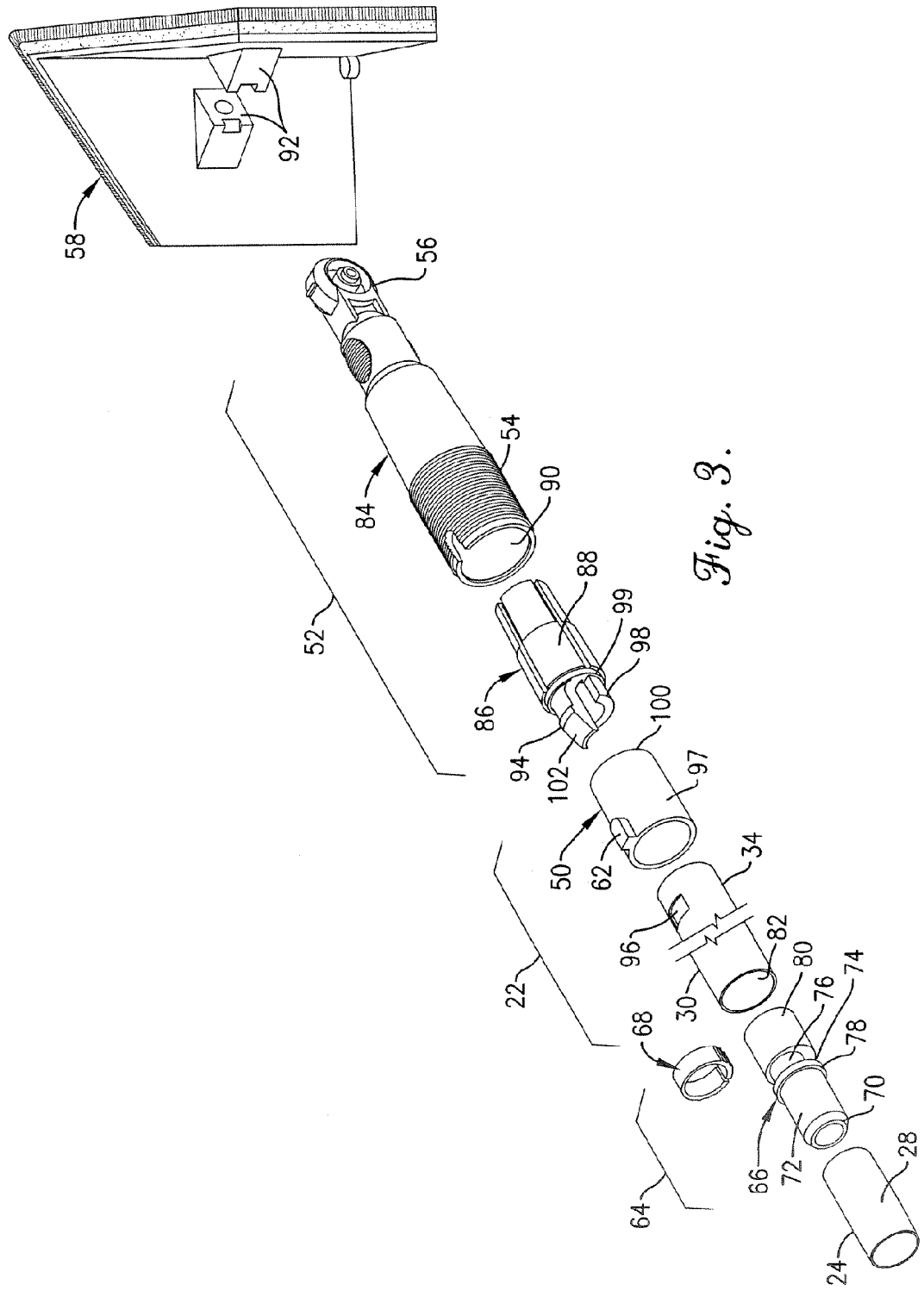
FIG. 3 is an exploded view of an adjustable extension pole and working tool.

Referring initially to FIG. 1, the extension pole selected for illustration comprises a base member 20 and an extension member 22. The base member 20 includes a base tube 24 having a proximal end 26 and a distal end 28. The extension member includes an extension tube 30 having a proximal end 32 and a distal end 34. Proximal end 32 of extension tube 30 has an opening 36 for receiving base tube 24. Distal end 28 of base tube 24 is slidably received in extension tube 30 in a telescopically interfitting relationship. Base tube 24 and extension tube 30 share a common longitudinal axis around which they are at least partially rotatable relative to one another. Base tube 24 and extension tube 30 can be shifted relative to one another along the longitudinal axis between an extended position where the reach of the extension pole is maximized and a retracted position where the reach of the extension pole is minimized. Base tube 24 and extension tube 30 are preferably composed of a relatively strong but light weight aluminum or synthetic resin material. Base tube 24 and extension tube 30 each are preferably substantially hollow and present a round cross sectional area. Base tube 24 and extension tube 30 are preferably configured to inhibit debris from entering the interior of the extension pole when base tube 24 and extension tube 30 are slidably intercoupled. Most preferably, base tube 24 and extension tube 30 have substantially no openings in their external, exposed surfaces which would allow debris to enter the extension pole.

Proximal end 26 of base tube 24 presents an opening which is preferably enclosed by an end cap 38. End cap 38 prevents debris from entering base tube 24 through the opening in proximal end 26. A base grip 40 is preferably mounted on proximal end 26. Base grip 40 includes a fixed portion 42 and a slidable (or compressible) portion 44. The interior surface of fixed portion 42 is fixedly secured to the exterior surface of base tube 24 by any means known in the art such as, for example, a flowable adhesive or two-sided tape. Slidable portion 44 is shiftably disposed on the exterior surface of base tube 24. Slidable portion 44 preferably includes a plurality of ribs 46 which are capable of being deformed when a longitudinal force is applied to the terminal end of slidable portion 44, as shown in FIG. 2. Base grip 40 is preferably composed of a resilient, deformable, synthetic material. Most preferably, base grip 40 is composed of foam rubber.

As shown in FIG. 1, an extension grip 48 is mounted on proximal end 32 of extension tube 30. Extension grip 48 is fixedly secured to the outer surface of extension tube 30 by any means known in the art such as, for example, a flowable adhesive or two-sided tape. Extension grip 48 can be composed of the same material used for base grip 40. As shown in FIG. 2, when the extension pole is in the retracted position with base tube 24 being slid into extension tube 30 nearly as far as possible, the terminal end of slidable portion 44 contacts an opposing terminal end of extension grip 48 in an abutting relationship. As base tube 24 is further slid into extension tube 30, the abutting relationship of slidable portion 44 and extension grip 48 forces ribs 46 of slidable portion 44 to be compressed and deformed, as illustrated in FIG. 2. The compression of slidable portion 44 provides a longitudinal force which resists further sliding of base tube 24 into extension tube 30.

As best seen in FIG. 2, an alignment member 50 is fixedly attached to distal end 34 of extension tube 30. Alignment member 50 is adapted to be received in a tool-holding assembly 52. Tool-holding assembly 52 includes a tube-receiving end 54 for receiving alignment member 50 and a tool-holding end 56 for holding a working tool element 58. Tool-holding assembly 52 includes an alignment notch 60 extending from the terminal end of tube-receiving end 54 towards tool-holding end 56. Alignment notch 60 is adapted to receive an alignment protrusion 62 which extends radially from alignment member 50 to thereby properly align extension member 22 and tool-holding assembly 52 and restrain relative rotation of extension member 22 and tool-holding assembly 52 when extension member 22 and tool-holding assembly 52 are coupled together. It will be appreciated that tool holding assembly 52 is preferably in the form of a handle so that the assembly and tool element cooperatively form a handheld tool that can be used apart from the extension pole.

Referring now to FIG. 3, a locking assembly 64 is coupled to distal end 28 of base tube 24 by any means known in the art. Locking assembly 64 comprises a lock body 66 and a lock collar 68 rotatably coupled to the lock body 66. Lock body 66 presents a tapered end 70 for facilitating insertion of lock body 66 into distal end 28 of base tube 24. Lock body 66 further presents an outer securing surface 72 which is fixedly secured to the interior surface of base tube 24. A circumferential eccentric slot 74 is formed in lock body 66 and defines an eccentric compression member 76 around which lock collar 68 is disposed. In FIG. 3, lock collar 68 is shown separate from lock body 66, however, during normal operation lock collar 68 will reside in eccentric slot 74 and around eccentric compression member 76. A ring 78 is disposed between eccentric slot 74 and securing surface 72 to restrain lock collar 68 from sliding onto base tube 24. A sliding surface 80 is disposed next to lock collar 68 on the side opposite of ring 78 and prevents lock collar 68 from sliding off of lock body 66. Sliding surface 80 and the outer surface of ring 78 are adapted to fit flushly with an inner surface 82 of extension tube 30 and to be slidably received therein.

Tool-holding assembly 52 comprises a body 84 and a releasable catch 86. Releasable catch 86 is adapted to be received and secured within tube-receiving end 54 of body 84. Releasable catch 86 is fixedly secured in body 84 by any means known in the art such as, for example, compression-fitting an outer holding surface 88 of releasable catch 86 with an inner surface 90 of body 84, as perhaps best seen in FIG. 8. Referring again to FIG. 3, tool-holding end 56 of tool-holding assembly 52 can be coupled to working tool element 58 via an attachment device 92.

As shown in FIG. 3, tube-receiving end 54 of tool-holding assembly 52 is adapted to be coupled to extension tube 30 via alignment member 50, a resilient latch 94, and a latch-receiving opening 96. Alignment member 50 is fixedly secured to distal end 34 of extension tube 30 by any means known in the art. Alignment member 50 includes projection 62 and an outer surface 97. Outer surface 97 is configured to fit generally flush within inner surface 90 of body 84. When alignment member 50 is inserted into tube-receiving end 54 of body 84, resilient latch 94 enters extension tube 30 and snaps into latch-receiving opening 96, thereby securing tool-holding assembly 52 to extension member 22. Releasable catch 86 includes a guide 98 to guide resilient latch 94 through alignment member 50 and into extension tube 30. Releasable catch 86 also includes a lip 99 which presses against a front surface 100 of alignment member 50 when resilient latch 94 is secured in latch-receiving opening 96 to thereby prevent further insertion of releasable catch 86 into extension tube 30. Resilient latch 94 includes a sloped contact surface 102 which allows resilient latch 94 to be shifted between a latched position in which resilient latch 94 is substantially undeformed and a unlatched position in which resilient latch 94 is partially elastically deformed and flexed. Moreover, the angle of surface 102 provides a cam that permits the tool to be automatically latched to the pole simply by inserting the alignment member 50 into the tube-receiving end 54 of assembly 52. Particularly, the contact surface 102 allows resilient latch 94 to be partially deformed during extension of resilient latch 94 through alignment member 50 and into extension tube 30 and then snapped into a latched position when resilient latch 94 is aligned with latch-receiving opening 96.

In an alternative embodiment (not illustrated), latch receiving opening 96 in extension tube 30 can be eliminated. In this configuration, the interior of alignment member 50 is formed with a suitable notch, rib, or ridge configured to receive resilient latch 94 and thereby secure tool-holding assembly 52 to extension member 22. In order for resilient latch 94 to be received in the latch-receiving notch, rib, or ridge of alignment member 50, distal end 34 of extension tube 30 is only partially received in alignment member 50 so that extension tube 30 does not cover or interfere with the latch-receiving notch, rib, or ridge formed on the inner surface of alignment member 50.

FIG. 4 is a sectional view showing tool-holding assembly 52 secured to extension tube 30 by resilient latch 94. In FIG. 4, resilient latch 94 is inserted into latch-receiving opening 96 in a latched position. FIG. 4 illustrates that a front surface 104 of lock body 66 defines an inwardly projecting cavity 105.

FIG. 5 illustrates resilient latch 94 being deformed by front surface 104 into an unlatched position. Front surface 104 of lock body 66 is positioned into contact with contact surface 102 of releasable catch 86 by shifting base tube 24 into extension tube 30 until, as shown in FIG. 2, slidable portion 44 of base grip 40 is contacted with and deformed by extension grip 32. Thus, working tool 50 and tool-holding assembly 52 can be disconnected from extension member 22 by simply sliding base tube 24 into extension tube 30 until front surface 104 of lock body 66 causes resilient latch 94 to be removed from latch-receiving opening 96 and pushes tool-holding assembly 52 out of contact with alignment member 50. Cavity 105 at least partially receives resilient latch 94 when front surface 104 is slid into contact which contact surface 102 of resilient latch 94 to thereby release resilient latch 94 from latch-receiving opening 96. The illustrated arrangement therefore provides "hands free" disconnection (and connection as described above) of the pole and tool.

Referring now to FIGS. 6 and 7, lock collar 68 is a ring-shaped member having a thin-walled portion 106 and a thick-walled portion 108. Thick-walled portion 108 has a break 110 therein which allows for circumferential expansion and contraction of lock collar 68. Lock collar 68 further comprises a plurality of friction ridges 112 protruding radially outward from thick-walled portion 108 and contacting interior surface 82 of extension tube 30. Lock collar 68 is received in eccentric slot 74 and rotatably disposed around eccentric compression member 76. Lock collar 68 exerts an outward radial force on interior surface 82 of extension tube 30. The magnitude of the outward radial force exerted by lock collar 68 is adjustable by changing the relative position of lock collar 68 and eccentric compression member 76.

In operation, when base tube 24 is rotated relative to extension tube 30 eccentric compression member 76 rotates relative to lock collar 68. When eccentric compression member 76 is positioned closest to thin-walled portion 106, as shown in FIG. 7, friction ridges 112 of lock collar 68 exert minimal force on interior surface 82 of extension tube 30. Thus, FIG. 7 illustrates an unlocked position. When base tube 24 and extension tube 30 are rotated relative to one another so that compression member 76 is rotated into contact with thick-walled portion 108, as shown in FIG. 6, friction ridges 112 of lock collar 68 are forced outward and exert a radial securing force on inner surface 82 of extension tube 30, thereby restraining relative sliding movement of base tube 24 and extension tube 30. Thus, FIG. 6 illustrates a locked position. In order to function properly, lock collar 68 is preferably composed of a resilient material such as, for example, a synthetic resin. The configuration of the locking assembly 64 shown in FIGS. 3, 6, and 7 allows the relative sliding of base tube 24 and extension tube 30 to be controlled by simply rotating base tube 24 and extension tube 30 relative to one another in either a clockwise or counter-clockwise direction.

Furthermore, the grips 40 and 48 and the arrangement of the tubes 24 and 30 provide two-handed operation of the pole at a point close to the user's body. Additionally, in the illustrated arrangement, with the outer tube 30 serving as the connection to the tool, debris (e.g., paint, dust, etc.) is essentially prevented from contaminating the sliding interconnection of the tubes, the lock mechanism, etc.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. An extended reach apparatus, said apparatus comprising:
   a first elongated member;
   a second elongated member slidably intercoupled with the first elongated member;
   a working tool assembly releasably coupled to the second elongated member;
   a catch assembly including a releasable catch that is associated with one of said second elongated member and said working tool assembly, and that removably couples the working tool assembly to the second elongated member,
   said catch being releasable from a locking condition, in which the catch securely locks the working tool assembly to the second elongated member such that decoupling of the working tool assembly from the second elongated member is restrained until the catch is released,
   said first and second elongated members being slidable relative to one another into a tool disconnect condition, thereby causing the catch to be automatically released from the locking condition to thereby decouple the working tool assembly from the second elongated member; and
   a locking assembly disposed between the first and second elongated members, said locking assembly being selectively actuatable to restrain relative sliding of the first and second elongated members.

2. The apparatus as claimed in claim 1,
   said first and second elongated members being telescopically intercoupled.

3. The apparatus as claimed in claim 2,
   said first elongated member being telescopically received in the second elongated member.

4. The apparatus as claimed in claim 3,
   said first and second elongated members comprising respective substantially cylindrical tubes.

5. The apparatus as claimed in claim 1,
   said locking assembly being actuatable by rotating the first and second elongated members relative to one another.

6. The apparatus as claimed in claim 5,
   said locking assembly including a lock body fixedly coupled to one of the elongated members and an expandable lock collar rotatably coupled to the lock body, said lock collar exerting a locking force on the other of the elongated members when the locking assembly is actuated.

7. An extended reach apparatus, said apparatus comprising:
   a first elongated member;
   a second elongated member slidably intercoupled with the first elongated member;
   a working tool assembly releasably coupled to the second elongated member; and
   a catch assembly including a releasable catch that is associated with one of said second elongated member and said working tool assembly, and that removably couples the working tool assembly to the second elongated member,
   said catch being releasable from a locking condition, in which the catch securely locks the working tool assembly to the second elongated member such that decoupling of the working tool assembly from the second elongated member is restrained until the catch is released,
   said first and second elongated members being slidable relative to one another into a tool disconnect condition, in which the catch is automatically released from the locking condition to thereby decouple the working tool assembly from the second elongated member,
   said tool disconnect condition being defined by the first elongated member operably contacting the catch assembly to automatically release the catch from the locking condition,
   said releasable catch including a resilient latch associated with the working tool assembly, said catch assembly further including a latch-receiving slot defined in the second elongated member.

8. The apparatus as claimed in claim 7,
   said resilient latch having an angled contact surface so that when the first elongated member is contacted with and forced to move relative to the angled contact surface the latch is shifted out of the slot, thereby releasing the catch and decoupling the working tool assembly from the second elongated member.

9. The apparatus as claimed in claim 8,
   said resilient latch being resiliently flexed when shifted away from a latched position, wherein the latch is disposed for receipt within the slot,
   said resilient latch being shifted away from the latched position when the second elongated member is contacted with and forced to move relative to the angled contact surface of the latch as the working tool assembly is coupled to the second elongated member, whereupon the resilient latch returns to the latched position and is received within the slot, thereby coupling the working tool assembly to the second elongated member.

10. The apparatus as claimed in claim 1,
    said first and second elongated members being slidable relative to one another to define fully extended and fully contracted positions,
    said tool disconnect condition corresponding to the first and second elongated members being slid together to the fully contracted position.

11. An extended reach apparatus, said apparatus comprising:
    a first elongated member;
    a second elongated member slidably intercoupled with the first elongated member;
    a working tool assembly releasably coupled to the second elongated member; and
    a catch assembly including a releasable catch that is associated with one of said second elongated member and said working tool assembly, and that removably couples the working tool assembly to the second elongated member,
    said catch being releasable from a locking condition, in which the catch securely locks the working tool assembly to the second elongated member such that decoupling of the working tool assembly from the second elongated member is restrained until the catch is released,
    said first and second elongated members being slidable relative to one another into a tool disconnect condition, thereby causing the catch to be automatically released from the locking condition to thereby decouple the working tool assembly from the second elongated member,
    said catch assembly including a latch and a latch-receiving slot, one of which is associated with the working tool assembly and the other of which is associated with the second elongated member,
    said latch being shiftable between a latched position and an unlatched position, with said latch being received within the slot to thereby secure the working tool assembly to the second elongated member when in the latched position, and said latch being removed from the slot to thereby permit decoupling of the working tool assembly from the second elongated member when in the unlatched position.

12. The apparatus as claimed in claim 11,
    said latch being shifted from the latched position to the unlatched position upon operable contact by and movement of the first elongated member relative to the latch as the first and second elongated members are slid relative to one another into the tool disconnect condition, thereby releasing the catch and decoupling the working tool assembly from the second elongated member.

13. The apparatus as claimed in claim 12,
    said latch being automatically shifted into the latched position as the working tool assembly is coupled to the second elongated member, thereby securing the working tool assembly to the second elongated member.

* * * * *